N. WISE.
INCANDESCENT ELECTRIC LAMP.
APPLICATION FILED AUG. 21, 1916.
1,352,860.
Patented Sept. 14, 1920.
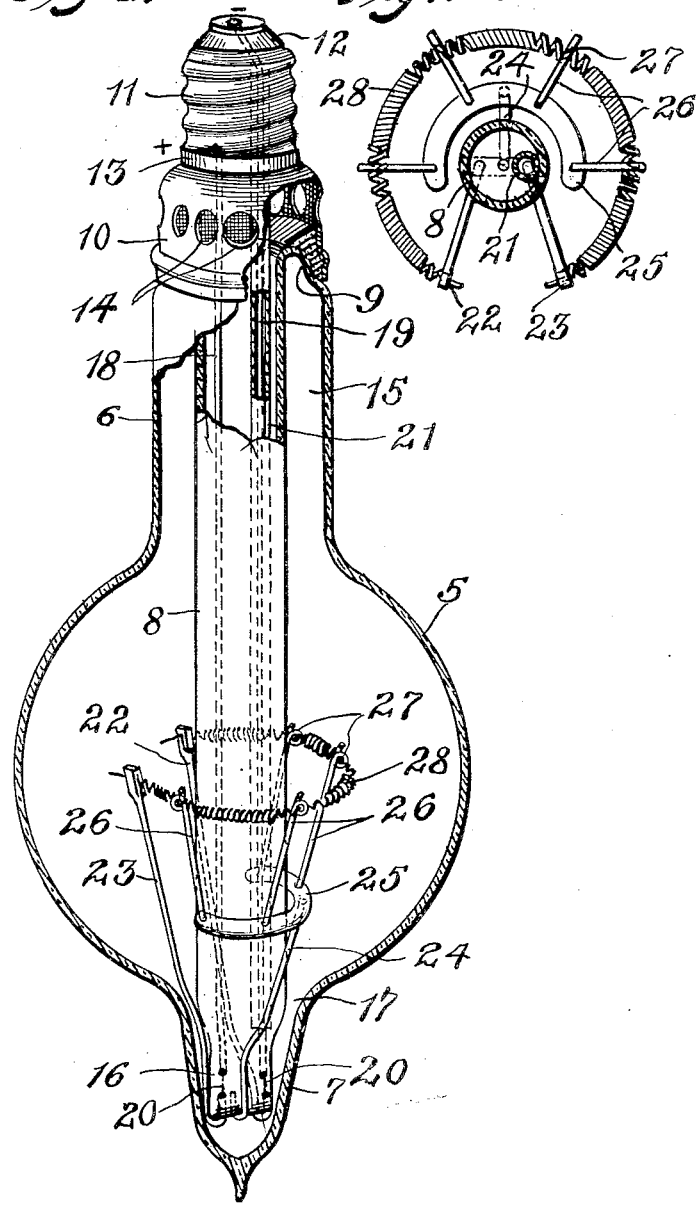
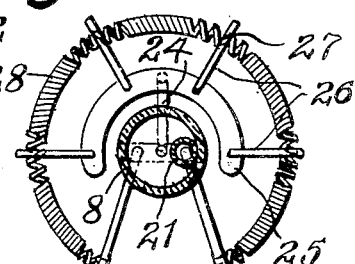
WITNESSES
Charles F. Wilcox.
John E. Burch.
INVENTOR
Nathan Wise,
BY Richard B. Owen.
ATTORNEY

UNITED STATES PATENT OFFICE.

NATHAN WISE, OF BROOKLYN, NEW YORK.

INCANDESCENT ELECTRIC LAMP.

1,352,860. Specification of Letters Patent. Patented Sept. 14, 1920.

Application filed August 21, 1916. Serial No. 116,136.

*To all whom it may concern:*

Be it known that I, NATHAN WISE, a citizen of the United States of America, residing at New York city, borough of Brooklyn, in the county of Kings and State of New York, have invented certain new and useful Improvements in Incandescent Electric Lamps, of which the following is a specification.

This invention has special reference to the class of incandescent electric lamps, and more particularly to gas-filled lamps, that is, those employing nitrogen or other gases within an evacuated chamber or bulb for the purpose of increasing the lighting efficiency by rapidly dissipating the heat within the bulb.

By way of explanation, it may be stated, as has been found by a varied experience and from tests made in connection with the manufacture of incandescent electric lamps, that the difficulty with all gas-filled lamps has been with the stems in which the platinum wires are sealed. These seals terminate near the top of the bulb adjacent to the usual threaded base or in the hottest zone of the bulb, and thus in practice have caused a great deal of trouble due to the cracking of the glass stem at the seal under subjection to this heat, thereby letting in air with the result that the filament is caused to burn out quickly on the direct current and also because such cracking results from an electrolytic deposit on the platinum, which either changes the coefficient of expansion of the platinum within the glass, or for any other reason causes the stem to crack at the seal, thereby letting in air and destroying the filament and making the lamp useless.

It is among the principal objects of the present invention to entirely overcome these serious troubles and objections in connection with incandescent electric lamps and particularly those of the gas-filled type as hereinbefore referred to and this is carried out mainly by extending the stem entirely through the length of the bulb so as to bring the seal down into the coolest zone of the bulb and in addition, ventilating the stem so as to conduct the heat away from the internal part of the bulb through perforations in the base of the lamp so as to permit the efficiency of the lamp to be brought up to a considerably higher point in view of the rapid dissipation of the heat, whereas in a lamp of the old type if the efficiency is raised beyond a certain point, the heat remains inside of the bulb and not being able to radiate fast enough it causes the filament to burn out in a very short time. It will, therefore, be seen that the lamp possesses the advantages of either permitting the raising of the efficiency of the lamp or lengthening the life thereof with the same or greater efficiency as the old type of lamp including devices which were heretofore patented, numerous tests having proven that on direct current there is no deposit made on the platinum, so that the objections heretofore specified are entirely eliminated.

A further object of the invention is to provide an improved form of lamp bulb having a reduced extension at the point or tip of the bulb into which the sealed end of the stem is extended, thereby narrowing the gap between the stem and the atmosphere through the glass wall of the bulb in such a manner as to more rapidly dissipate the heat generated within the bulb, while said extension owing to its location at the coolest zone of the bulb is maintained relatively cool so that it can be grasped by hand for removing the bulb without burning the fingers, even after the lamp has been burned for some length of time, instead of necessitating the use of a tool or that time be allowed for the cooling of the bulb where renewal or exchanges are necessary.

Further objects of the invention are to provide an improved support for the filament so as to eliminate the conveyance of heat to the seal or parts of the support to prevent cracking thereof, this being accomplished by extending the support totally from the bottom of the stem at the coolest zone of the bulb upward to a point adjacent to the center or widest part of the bulb so as not only to avoid destruction of the support as in the old lamps where glass parts are employed, but also to reduce breakage from shocks and vibrations to a minimum, the lamp being such as not to materially increase the cost of production or manufacture over the cost of producing the old style lamps.

With the above objects and others in view, as will appear as the description proceeds, the invention comprises the various novel features of construction and arrangements of parts which will be more fully described hereinafter and set forth with particularity in the claims appended hereto.

Reference is had to the accompanying drawings forming a part of this application, in which like characters indicate the corresponding parts throughout the several views and wherein, Figure 1 is a sectional perspective view of the improved form of incandescent electric lamp.

Fig. 2 is a cross-sectional view through the stem on looking downwardly upon the supports employing the form of filament in Fig. 1.

Referring to the drawings in detail, there is shown an incandescent electric lamp including a bulb 5 which may be of any desired shape, but which as shown is substantially round, spherical or globular and provided with a reduced neck portion 6 and formed at its opposite end with a reduced extension or depending point or tip 7 with the apex thereof in an axial line with the centers of the parts 5 and 6. In lieu of the ordinary stem within the bulb is a hollow tubular stem 8 which is sealed to the neck portion of the bulb as shown at 9, being thereby continuous with 5 and 6, and all of said parts being of transparent or other glass as is usual, and the stem 8 extending substantially entirely through the length of the bulb including the neck portion 6 and the body 5, as well as into the reduced part or extension 7 but not contacting with the wall thereof. The part of the neck portion 6 where joined to the stem 8 is preferably of reduced size for the attachment by means of suitable cement of the ferrule or cap portion 10 having a reduced end which is held within a glass cup 12 the latter having a metallic threaded sleeve 11 around its exterior to enter the usual socket provided to receive lamp bases. Thus the surface of the glass cup 12 will be exposed at both ends of the sleeve 11 where indicated by the lead lines extending from the numerals 12 and 13 in Fig. 1. The ferrule or cap portion 10 is provided with a plurality of circumferential apertures or perforations 14, which establish communication between the atmosphere and the interior of the tubular stem 8 through the hollow space between the seal 9 where the stem joins to the neck portion of the bulb, and the reduced threaded portion of the base, so as to rapidly carry off or dissipate the heat generated within the bulb, to prevent cracking of the seal as will be hereinafter explained.

As heretofore specified, instead of terminating the stem adjacent to the neck portion or hottest zone 15 of the lamp, the same is brought down through the bulb and terminates in a seal 16 located in the coolest zone 17 at the lower part of the bulb or within the extension 7 projecting from the bottom of the bulb as shown. The lead-in wires 18 and 19 pass through the hollow stem 8 from the base to which they are connected in the usual way for closing the circuit upon the lamp being secured in an incandescent light socket and said lead-in wires emerge into the bulb proper and into the gas-filled space therein, nitrogen being preferably employed, through the medium of the platinum or other connections 20 at the sealed portion 16 of the stem. It is to be observed that the stem is not extended primarily for the purpose of facilitating the support of the filament and that it is not provided with a solid portion below the seal, but that the seal is brought into juxtaposition with respect to the bottom of the bulb and the wall thereof, which latter is facilitated by extending the sealed end of the stem into the reduced extension 7 so as to provide but a very narrow gap between the seal and the outside atmosphere through the wall of the bulb at the reduced extension which is entirely surrounded by the outside atmosphere and exposed to the cooling effect thereof. The efficient cooling of the seal and filament is also due to the thermo-circulation of the gases within the bulb, the heated gases rising and the cool gases moving downward so as to keep up a continuous circulation within the lamp. The cooling is also materially assisted by extending the seal of platinum or appropriate substitute beyond the bulb proper and into the extension. One of the lead-in wires is also incased in a small insulating tube 21 shown in Fig. 1 so as to electrically separate it from the adjacent lead-in wire and prevent short-circuiting, in addition to facilitating the positioning of the seal at the bottom of the bulb or in the coolest zone of the lamp where breakage from the heat is quite impossible.

In order to support the filament totally from the bottom of the stem in contradistinction to the old method of supporting the filament at the top and bottom of the stem, particularly in the case of filaments running longitudinally of the stem, as well as to efficiently provide against breakage from shocks and vibrations, at the sealed portion 16, the lead-in wires 18 and 19 are connected through the medium of the connections 20 with conductor supports 22 and 23, the same being supported in the end of the stem where closed to produce the seal, well down in the bottom of the bulb and extension 7. These conductor supports extend upwardly in divergent relation and are of resilient or spring metal in addition to being electrical conductors, so that when the same are passed into the bulb from the base end of the latter they will spring outward and be suitably spaced to prevent the formation of a spark gap therebetween. In conjunction with the conductor supports 22 and 23, an additional and similarly mounted support 24 is provided, the same being mounted in the sealed end of the stem between the conductor supports and at the opposite side thereof so as to hold a supporting member 25, said supporting member 25 being preferably of horse-shoe shape or such as to partly encircle the stem in spaced relation to the latter and being preferably of glass or other vitreous material constituting a non-conductor of electricity and in turn serving to carry a plurality of upwardly diverging filament supporting arms 26 which have their upper ends terminating in line with the upper ends of the conductor supports 22 and 23 and formed with loops 27 to receive the filament 28 which is preferably helical as shown. The filament 28 may be of the spirally wound type with one end connected to the support 22 and the other end to the support 23. By placing the supporting arms 26 at an angle inclining toward the glass support 25 or diverging upwardly as specified, a larger diameter of filament can be entered through the neck of the bulb packed, compressed and springing back in shape after they are passed through the neck so as to space or remove the filament as far as possible from the stem 8 to eliminate the possibility of the excessive heat from the tube forming the stem in any wise injuring the filament, in addition to projecting the same to the bottom or forward part of the bulb and into the reduced point or tip thereof as shown and in such a manner as to eliminate the possibility of the seal being broken as with the old type of lamp wherein the exposure of the seal to the great heat generated within the lamp causes the cracking of the glass at the seal so as to let in air and cause the filament to burn out quickly in addition to the formation of an electrolytic deposit on the platinum connections, which results in changing the coefficient of expansion of the platinum due to its exposure to the oxygen of the air with the resultant cracking of the stem and destruction of the filament so as to make the lamp useless. The cause of the electrolytic deposit is that owing to the lead in the glass composition when hot, the lead is carried through the glass and deposited upon one of the terminals as an electric plating. Numerous tests have proven that on alternating current there is no deposit made on the platinum so that cracking of the seal and destruction of the lamp in this manner is entirely eliminated. Furthermore, the spring metal supporting arms 26 do not convey the heat to the seal because of said arms being supported by the glass or non-contacting supporting member 25, which in addition is below the filament instead of above the same as is the case in the conventional form of tungsten or gas filled lamps where the filament is located below the support.

In addition to the filament supports serving to efficiently absorb shocks and jars so as to prevent transference thereof to the filament in such a manner as to break the latter, the positioning of the filament around the center of the bulb, especially in the type of bulb particularly described, is facilitated and by running the stem entirely through the length of the bulb, the heat generated within the latter is conducted away from the internal part of the bulb through the perforations 14 by which the internal part of the stem is placed in communication with the atmosphere. In this manner I am enabled to bring up the efficiency of the lamp to a higher point since inasmuch as the filament works at its highest efficiency when heated to a maximum point, I am enabled to use a greater current density in order to secure this heating and illumination of the filament without at the same time endangering the seals or without heating the seals to a point where they would crack the glass. It will be further apparent that this arrangement insures the greater durability of the lamp since lamps are frequently burned out as a result of the admission of air due to the cracking of the glass tube 8 at the point where the conductors lead in as stated above.

From the foregoing description, taken in connection with the accompanying drawings, the advantages of the construction and of the method of operation will be readily apparent to those skilled in the art to which the invention appertains and while I describe the principle of operation of the invention, together with the devices which I now consider to be the best embodiments thereof, I desire to have it understood that the devices shown are merely illustrative, and that such changes may be made when desired as are within the scope of the device as claimed.

Having thus described my invention, what I claim as new and desire to secure by Letters Patent of the United States, is:

1. An incandescent electric lamp comprising a bulb, a stem projecting through the bulb, said bulb having an extension and said stem extending into said extension, lead-in wires disposed in the stem, filament supports carried by the lower end of the stem, a filament carried thereby and conductors connected to the lead-in wires by seals located within the stem and also electrically connected to the filament, said filament supporting means extending upwardly from the bottom of the stem.

2. An incandescent electric lamp comprising a bulb, a stem projecting through the bulb, said bulb having an extension and said stem extending beyond the bulb proper and into said extension, lead-in wires disposed through the stem, filament supports carried by the stem, a filament carried thereby wholly from the lower end of the stem, conductor supports carried by the stem near the lower end thereof and connected to the filament, and platinum seals connecting the lead-in wires to the conductor supports through the stem.

3. A gas-filled incandescent lamp comprising a metallic screw-threaded base, a bulb having a neck portion with a reduced portion and a reduced extension at the tip thereof, said base having apertures therethrough, a hollow stem joined to the neck portion at the base end of the lamp, said neck portion being cemented to said base to establish communication between the atmosphere and the interior of the stem through the aperture through the base and a filament supported in electrical connection by the stem, the supporting means extending from within the area of the reduced extension.

4. A gas-filled incandescent lamp comprising a metallic screw-threaded base, a bulb having a neck portion and a reduced extension at the tip thereof, a hollow stem joined to the neck portion at the base end of the lamp, said neck portion being cemented to said base to establish communication between the atmosphere and the interior of the stem through the base, lead-in wires connected to the base and extending through the stem, filament supports carried by the lower end of the stem and springing upwardly and outwardly, certain of said supports forming conductors, platinum seal connections between said conductors and the lead-in wires in the cool zone of the lamp at the extension and a substantially circular filament carried by said supports and in connection with said conductor supports.

5. A gas-filled incandescent lamp comprising a metallic screw-threaded base, a bulb having a neck portion and a reduced extension at the tip thereof, a hollow stem joined to the neck portion at the base end of the lamp, said neck portion being cemented to said base to establish communication between the atmosphere and the interior of the stem through the base, lead-in wires connected to the base and extending through the stem, filament supports carried by the lower end of the stem and springing upwardly and outwardly, certain of said supports forming conductors, platinum seal connections between said conductors and the lead-in wires in the cool zone of the lamp at the extension, a vitreous filament supporting member carried by the supports other than the conductors, supporting arms carried by said vitreous filament supporting member, and a helical filament supported by the conductors of the said supporting arms and encircling the stem.

6. In an incandescent electric lamp, a bulb, a base connected to the bulb, a tube forming a stem, said tube extending from the base to the tip of the bulb, lead-in wires passing through the stem, an insulating member around one of said wires continuously of its length, the interior of the tube being placed in communication with the atmosphere to cause dissipation of the heat generated within the lamp and a filament supported from the lower portion of the stem and electrically connected to the lead-in wires through a seal at the lower portion of the stem, as and for the purposes described.

7. In an incandescent electric lamp, a bulb, a base connected to the bulb, a tube forming a stem, said tube extending from the base to the tip of the bulb, lead-in wires passing through the stem, an insulating member around one of said wires continuously of its length, the interior of the tube being placed in communication with the atmosphere to cause dissipation of the heat generated within the lamp, a helical filament around the stem at substantially the central portion of the bulb of the lamp, the ends of the filament being spaced apart, conductor supports carrying the filament solely from beneath and connected to the lead-in wires, and other supports for said filament, all of said supports being in the form of upwardly and outwardly springing arms adapted to be collapsed for insertion into the bulb.

8. In a gas-filled incandescent electric lamp, a bulb comprising a substantially spherical portion having a neck part with a reduced portion, a stem sealed to the neck part at the upper end thereof and being in the form of a tube extending to the bottom of the bulb, a perforated metallic base fastened on the reduced portion of the neck and establishing communication between the interior of the stem and the atmosphere, and a filament supported in the bulb solely from the lower end of the stem, said stem being provided with a seal near its lower end.

9. In a gas-filled incandescent electric lamp, a bulb comprising a substantially spherical portion having a neck part with a reduced portion, a stem sealed to the neck part at the upper end thereof and being in the form of a tube extending to the bottom of the bulb, a perforated metallic base fastened on the reduced portion of the neck and establishing communication between the interior of the stem and the atmosphere, and a filament supported in the bulb, said stem being provided with a seal near its lower end, said bulb having a reduced extension at its tip and within the area of the bulb constituting the cool zone thereof whereby destruction of the seal is obviated and the interior of the stem communicating with the atmosphere through the lower end thereof.

10. An incandescent electric lamp comprising a bulb, a stem projecting through the bulb, said bulb having an extension and said stem extending beyond the bulb proper and into said extension, lead-in wires disposed through the stem, filament supports carried by the stem, a filament carried thereby from the lower end of the stem, conductor supports carried by the stem near the lower end thereof and connected to the filament and seals connecting the lead-in wires to the conductor supports through the stem.

11. An incandescent electric lamp comprising a bulb, a stem projecting through the bulb, said bulb having an extension and said stem extending beyond the bulb proper and into said extension, lead-in wires disposed through the stem, filament supports carried by the stem, a filament carried thereby wholly from the lower end of the stem, and conductor supports carried by the stem near the lower end thereof and connected to the filament and lead-in wires.

12. A gas-filled incandescent lamp comprising a metallic screw-threaded base, having apertures therein, a bulb having a neck portion and a reduced extension at the tip thereof, a hollow stem joined to the neck portion at the base end of the lamp, said neck portion being cemented to said base to establish communication between the atmosphere and the interior of the stem through the apertures in the base, lead-in wires connected to the base and extending through the stem, filament supports carried by the lower end of the stem and springing upwardly and outwardly, certain of said supports forming conductors, seal connections between said conductors and the lead-in wires in the cool zone of the lamp at the extension and a filament carried by said supports and in connection with said conductor supports.

13. In a gas-filled incandescent electric lamp, a bulb comprising a substantially spherical portion having a neck part with a reduced portion, a stem sealed to the neck part at the upper end thereof and being in the form of a tube extending to the bottom of the bulb, a perforated metallic base fastened on the reduced portion of the neck and establishing communication between the interior of the stem and the atmosphere, and a filament supported in the bulb, said stem being provided with a seal near its lower end to which the transference of heat from the filament is prevented by the nonconductor, said bulb having a reduced extension at its tip and within the area of the bulb constituting the cool zone thereof whereby destruction of the seal is obviated.

14. In an incandescent lamp, a bulb having a pocket in its wall, the interior of said pocket communicating with the interior of the bulb, a stem within the bulb, and lead in wires and filament supports mounted in said stem, the portions of the stem having said lead in wires and filament supports being located within the pocket.

15. An incandescent lamp including a bulb having an extension formed thereon defining a pocket on the interior of the bulb, a stem within the bulb, lead in wires sealed in the stem, and filament supports sealed in the stem and in electrical communication with the lead in wires, the portion of the stem having the seals extending into the pocket.

In testimony whereof I affix my signature in presence of two witnesses.

NATHAN WISE.

Witnesses:
 LUCILLE D. SACHS,
 JOHN E. BURCH.